A. B. HURD.
Spring Scale.
No. 82,842. Patented Oct. 6, 1868.
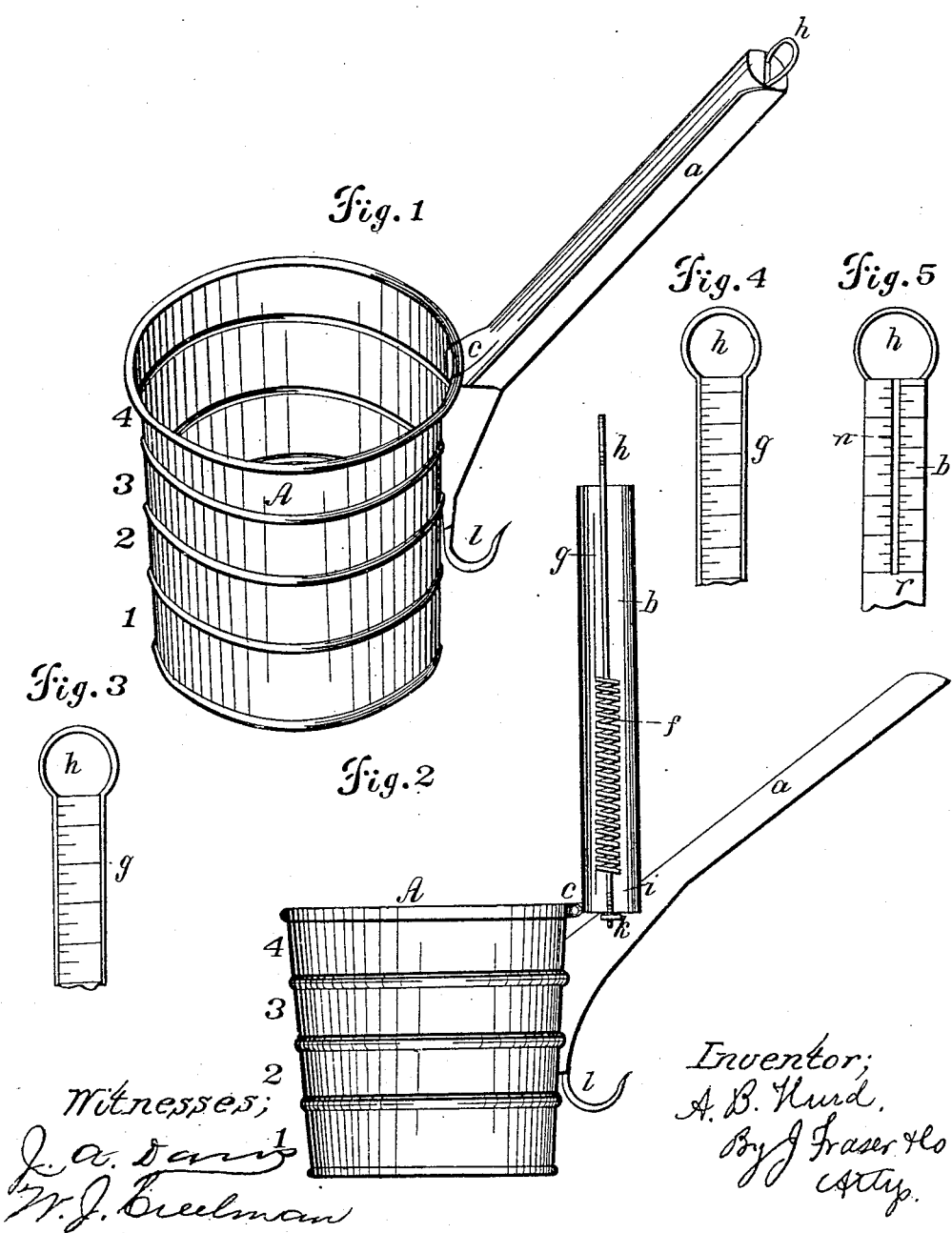

United States Patent Office.

A. B. HURD, OF WATKINS, NEW YORK.

Letters Patent No. 82,842, dated October 6, 1868.

---

IMPROVEMENT IN COMBINED MEASURE AND WEIGHER.

---

*The Schedule referred to in these Letters Patent and making part of the same.*

---

TO ALL WHOM IT MAY CONCERN:

Be it known that I, A. B. HURD, of Watkins, in the county of Schuyler, and State of New York, have invented a certain new and useful Improvement in Combined Measures and Weighers; and I do hereby declare that the following is a full and exact description thereof, reference being had to the accompanying drawings, making part of this specification.

Figure 1 is a perspective view of the device in position for use as a dipper.

Figure 2, a view in position for weighing.

Figures 3, 4, and 5, detail views of the scale or index-arrangement.

Like letters of reference indicate corresponding parts in all the figures.

My invention consists, essentially, in combining with a suitable receptacle, a hinged handle, that serves as a balance or scale, and also a hook or equivalent, by which solids are attached.

In the accompanying drawings, A indicates a dipper or other receptacle, graduated or divided into degrees, 1, 2, 3, 4, &c., so as to serve as a measure.

To the rear of this is attached a rigid bearing-arm, $a$, and a handle, $b$, which is hinged, at $c$, so as to turn to any desired position. When turned back, as in fig. 1, the handle, with bearing $a$, serves as an ordinary handle for the receptacle; but when turned up, as in fig. 2, it serves as a balance or scale for weighing, as will presently be seen.

Inside the hinged handle is fitted a coiled spring, $f$, or equivalent, attached to a slide, $g$, which extends through a slot in top of the handle, and has a loop, $h$, by which the whole device is suspended.

The extremity, $i$, of the spring, has a nut, $k$, screwing on the lower end, by which the tension of the spring may be adjusted at any time when it slackens or loses its elasticity. This is a matter of very great importance, as I am thereby enabled to adjust at any time and keep the balances accurate. This effect has never been produced in ordinary balances, so far as I am aware, and, indeed, cannot be easily produced, since, in such cases, the loop or hook to which the weight attaches is situated at the bottom, and the end, $i$, does not extend through. In a word, in the ordinary balance the weight attaches to the spring, and the hand holds the frame or case; while in my device the weight attaches to the frame or sustaining part, while the hand holds on the spring. This enables me to adjust the tension of the spring, as above described.

To the body of the dipper or vessel is attached a hook, $l$, either rigidly or by a suitable swivel, by which means solids, too bulky for weight inside, at any time, may be attached for weighing.

Two scales or indexes are employed, one for indicating the weight of the contents of the dipper, and the other for indicating the outside weight on the hook. These weights must necessarily differ, since, in weighing inside, the finger must be pressed on the false handle, $a$, to hold the dipper in an upright position, which adds to that weight. These two scales may either be marked on the opposite sides of slide $g$, as indicated in figs. 3 and 4; or outside the handle, $b$, on opposite sides of a slot, $p$, in which runs a pointer, $r$, attached to the slide, as shown in fig. 5. The pressure on false handle $a$, to keep the dipper upright, varies with the weight within, and the excess of weight is added to the scale or index, so that the notches indicate only the real weight of the material. This is very easily adjusted by experimenting in the manufacture of the first device, and the subsequent ones are made from it.

I do not claim the broad principle of combining a balance or scale with the handle of a receptacle, as I am aware that a flour-scoop or similar instrument, with a stiff handle, has been so arranged.

What I claim as my invention, and desire to secure by Letters Patent, is—

1. The combination of the hook $l$ with receptacle A, and hinged balance-handle $b$, in the manner and for the purpose specified.

2. The combined arrangement of the receptacle A, stiff arm $a$, hinged handle $b$, with balance $f$, and the hook $l$, the said receptacle answering the double purpose of weighing and measuring, and the balance being adjustable by nut $k$, the whole as described, and operating in the manner and for the purpose specified.

In witness whereof, I have hereunto signed my name in the presence of two subscribing witnesses.

A. B. HURD.

Witnesses:
H. H. SMITH,
C. H. FIRMAN.